US011852750B2

(12) United States Patent
Kim (10) Patent No.: US 11,852,750 B2
(45) Date of Patent: *Dec. 26, 2023

(54) METHOD AND APPARATUS FOR RADAR SIGNAL PROCESSING USING RECURRENT NEURAL NETWORK

(71) Applicant: SMART RADAR SYSTEM, INC., Seongnam-si (KR)

(72) Inventor: Jong Il Kim, Yongin-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 397 days.

This patent is subject to a terminal disclaimer.

(21) Appl. No.: 16/457,887

(22) Filed: Jun. 28, 2019

(65) Prior Publication Data

US 2020/0408881 A1 Dec. 31, 2020

(51) Int. Cl.
*G01S 7/41* (2006.01)
*G01S 7/35* (2006.01)

(52) U.S. Cl.
CPC .............. *G01S 7/417* (2013.01); *G01S 7/352* (2013.01); *G01S 7/356* (2021.05)

(58) Field of Classification Search
CPC ........... G01S 7/417; G01S 7/352; G01S 7/356
See application file for complete search history.

(56) References Cited

U.S. PATENT DOCUMENTS

| 5,621,863 | A | 4/1997 | Boulet et al. | |
|---|---|---|---|---|
| 6,366,236 | B1* | 4/2002 | Farmer | G01S 13/34 342/195 |
| 9,977,115 | B2 | 5/2018 | Park | |
| 11,126,834 | B2* | 9/2021 | Lee | G01S 13/04 |
| 2015/0226848 | A1* | 8/2015 | Park | G01S 7/354 342/70 |
| 2017/0322300 | A1* | 11/2017 | Kageme | G01S 13/582 |
| 2019/0162010 | A1* | 5/2019 | Rafrafi | G07C 9/00174 |
| 2019/0162821 | A1* | 5/2019 | Rafrafi | G01S 7/352 |
| 2019/0162822 | A1* | 5/2019 | Rafrafi | B60R 25/2054 |
| 2019/0242975 | A1* | 8/2019 | Tai | G06F 9/5027 |
| 2019/0258878 | A1* | 8/2019 | Koivisto | G06V 20/584 |

(Continued)

FOREIGN PATENT DOCUMENTS

| JP | 2003-507716 A | 2/2003 |
|---|---|---|
| KR | 10-1996-0005344 A | 2/1996 |

(Continued)

*Primary Examiner* — Bernarr E Gregory
*Assistant Examiner* — Juliana Cross
(74) *Attorney, Agent, or Firm* — INSIGHT LAW GROUP, PLLC; Seung Lee (57) ABSTRACT

One-dimensional data obtained by performing a Fourier transform on a digitally converted frequency modulated continuous wave (FMCW) radar signal at every pulse repetition interval is input to a recurrent neural network (RNN) to find the probability of the existence of a target in each range index. The range indices, i.e., bit frequencies are selected based on the probability. In order to reduce the size of the RNN, windowing may be applied. In addition, a speed-index-specific coefficient value may be calculated by accumulating and performing a Fourier transform on the selected bit frequencies in which the target exists over a plurality of pulse repetition intervals. Thus, it is possible to calculate the speed of the target.

10 Claims, 6 Drawing Sheets

(56) References Cited

U.S. PATENT DOCUMENTS

| | | | | |
|---|---|---|---|---|
| 2020/0057141 | A1* | 2/2020 | Kim | G01S 13/726 |
| 2020/0142029 | A1* | 5/2020 | Brooker | G01S 13/87 |
| 2020/0292660 | A1* | 9/2020 | Meissner | G01S 13/931 |
| 2020/0320286 | A1* | 10/2020 | Lin | G06V 40/103 |
| 2020/0333453 | A1* | 10/2020 | Mende | G01S 13/91 |
| 2020/0371524 | A1* | 11/2020 | Parchami | G06K 9/00785 |
| 2021/0149041 | A1* | 5/2021 | Cho | G01S 7/04 |
| 2021/0181306 | A1* | 6/2021 | Kim | G01S 7/417 |
| 2021/0231775 | A1* | 7/2021 | Pezeshk | G01S 7/417 |
| 2021/0232228 | A1* | 7/2021 | Nguyen | A61B 5/1122 |
| 2021/0255304 | A1* | 8/2021 | Fontijne | G06N 3/044 |

FOREIGN PATENT DOCUMENTS

| | | |
|---|---|---|
| KR | 10-2014-0071828 A | 6/2014 |
| KR | 10-2014-0120593 A | 10/2014 |
| KR | 10-2016-0054349 A | 5/2016 |
| KR | 10-2016-0055590 A | 5/2016 |

* cited by examiner

METHOD AND APPARATUS FOR RADAR SIGNAL PROCESSING USING RECURRENT NEURAL NETWORK

BACKGROUND

1. Field

The following description relates to a technique for processing signals received from a radar.

2. Description of Related Art

For example, a signal processing technique for a frequency modulated continuous wave (FMCW) radar such as that disclosed in U.S. Patent Publication No. US2015/0226848A1 is known. Range data, which indicates range-index-specific coefficient values, is calculated by performing a digital conversion on reflected waves reflected from a target and received through a reception antenna and then performing a fast Fourier transform (FFT) at every pulse repetition interval (PRI). Data obtained by performing an FFT over N PRIs is stored in a memory. Subsequently, speed-index-specific coefficient values are calculated by performing the second FFT on the stored data for each range index and then are stored in the memory. Among range-speed-index-specific coefficient values stored in the memory, coefficient values that are likely to be targets are selected based on constant false alarm rate (CFAR) detection. Subsequently, the speeds and ranges of the selected targets may be output.

Here, the CFAR detection includes applying a variable detection threshold in the presence of noise and clutter to maintain a false alarm rate at a constant level, removing the noise and the clutter, and then selecting a meaningful bit frequency. Cell-Averaging CFAR (CA-CFAR), Order Statistics-CFAR (OSO-CFAR), and the like are well known depending on the selection method for the detection threshold. Depending on the detection threshold, detection failure or overdetection may occur. However, it is still difficult to set the detection threshold appropriately according to various environmental conditions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to the raising of the reliability of detecting targets in radar signals. Furthermore, the following description additionally relates to the simplifying of a radar signal processing algorithm.

In one general aspect, one-dimensional data obtained by performing a Fourier transform on a digitally converted frequency modulated continuous wave (FMCW) radar signal at every pulse repetition interval is input to a recurrent neural network (RNN) to find the probability of the existence of a target in each range index. The range indices, i.e., bit frequencies are selected based on the probability. In order to reduce the size of the RNN, windowing may be applied.

In another general aspect, a speed-index-specific coefficient value may be calculated by accumulating and performing a Fourier transform on the selected bit frequencies in which the target exists over a plurality of pulse repetition intervals. Thus, it is possible to calculate the speed of the target.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above or other aspects will be implemented through embodiments described with reference to the accompanying drawings. It is to be understood that the components of each embodiment may be variously combined therein unless otherwise stated or mutually contradictory.

Figure 1:
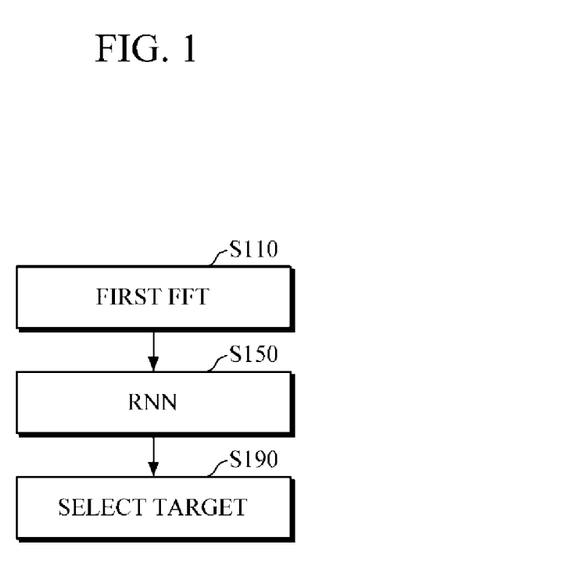
FIG. 1 is a flowchart showing a method for radar signal processing according to an embodiment.

FIG. 1 is a flowchart showing a method for radar signal processing according to an embodiment. A radar signal received from an antenna is amplified, frequency-synthesized, filtered, digitally sampled, and supplied as a frequency modulated continuous wave (FMCW) digital radar signal according to the proposed invention. As shown, a Fourier transform is performed on the FMCW digital radar signal at every pulse repetition interval (PRI), which is called a chirp to generate range data, which indicates range-index-specific coefficient values (S110). When a pulse repetition interval, which is called a chirp, is referred to as PRI and a sampling frequency is referred to as fs, the number of samples per pulse repetition interval is PRI×fs. M coefficient values are generated through an M-point FFT with PRI×fs inputs. The coefficient values obtained by performing a Fourier transform are referred to as "range data" in the sense that they include range information.

Subsequently, the range data is input to a recurrent neural network (RNN) to find the probability of the existence of a target in a range index of interest (S150). The RNN has a recurrent structure in which a hidden node of a previous sequence is connected by a directional edge. Both of current input data and previous input data are considered.

The RNN is a network having a recurrent structure that helps keep internal information, and has a structure in which past data affects the future. The RNN is often successfully applied to natural language processing. A coefficient value obtained by performing a Fourier transform at only one current PRI is provided, but the RNN can calculate the probability of the existence of the target by internally considering the influence of the coefficient values obtained by performing a Fourier transform in the past. Thus, it is possible to save a memory and apply a simple computation structure.

In the shown embodiment, the RNN is configured as a supervised learning type network. Coefficient values obtained by performing a Fourier transform during N PRIs and information regarding whether the target exists in each of the range indices are provided to state variables of each hidden layer, and thus supervised learning is achieved. In this case, the learning is made such that a final output is generated after K PRIs. That is, the existence of the target is confirmed after K PRIs.

Subsequently, a range index in which the target exists is selected based on the probabilities of the existence of the target in the range indices. In an embodiment, a range index having a target existence probability of 80% or higher is selected as the range index in which the target exists.

Figure 2:
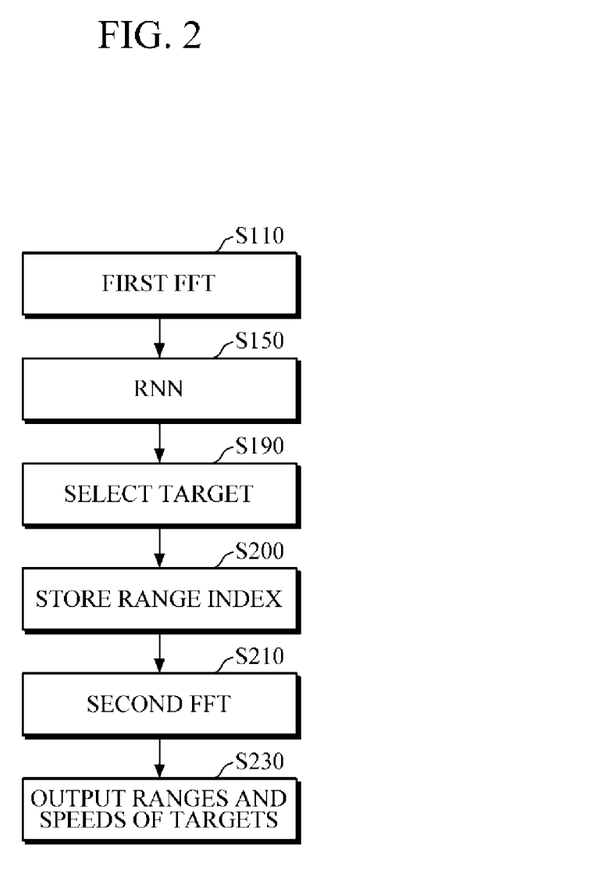
FIG. 2 is a flowchart showing a method for radar signal processing according to another embodiment.

FIG. 2 is a flowchart showing a method for radar signal processing according to another embodiment. The elements referred to by the same reference numerals as those shown in the embodiment of FIG. 1 have similar configurations, and thus a detailed description thereof will be omitted. According to an additional aspect, the method for the radar signal processing according to the shown embodiment includes storing range data of the selected range index in which the target exists over a plurality of PRIs after the target is selected (S200). Subsequently, a Fourier transform is performed on the range data stored over the plurality of PRIs to calculate a speed-index-specific coefficient value (S210). When a plurality of range indices in which the target exists are selected, that is, when a plurality of targets are selected, a Fourier transform is performed on each piece of range data. Subsequently, the ranges and speeds of the selected targets are calculated and output (S230).

Fourier coefficient values obtained by performing the $2^{nd}$ FFT on the output coefficient values of the $1^{st}$ FFT in the direction of the PRI index, that is, in the direction of the time axis are referred to as "speed index"-specific coefficient values in the sense that they include speed information. Computations by an FMCW radar to find the range and speed from a bit frequency are well known, and a detailed description thereof will be omitted.

Figure 3:
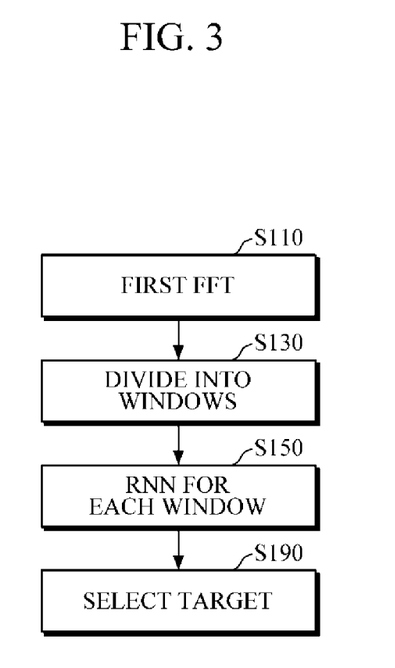
FIG. 3 is a flowchart showing a method for radar signal processing according to still another embodiment.

FIG. 3 is a flowchart showing a method for radar signal processing according to still another embodiment. Similarly to the embodiment of FIG. 1, a Fourier transform is performed on an FMCW digital radar signal at every PRI to generate range data, which indicates range-index-specific coefficient values (S110). In the shown embodiment, M coefficient values are generated through an M-point FFT with PRI×fs inputs.

Subsequently, each of M pieces of range data includes data having a plurality of continuous range indices, and a plurality of windows are set to partially overlap each other (S130). Each window is a one-dimensional window consisting of P continuous FFT coefficient values. When the windows are set to include E range indices of interest and B range indices present on each of the left and right sides of each of the range indices of interest, that is, the windows are set to include P (=2B+E<M) range indices, the range indices of interest other than 2B range indices, which correspond to an overlapping part in each window, are set to cover all the range indices. That is, when the number of windows is Q, it is achieved that M=Q×E.

Subsequently, data belonging to each window is processed with the same unit RNN to find the probability of the existence of the target in each range index (S150). In the shown embodiment, Q unit RNNs have P FFT coefficient values as an input and then output the existence of, and the probability of the existence of, the target of each of E range indices of interest among P range indices. Since the unit RNNs process different windows, the probabilities of the existence of the targets of the E range indices of interest are output in multiple manners.

In the shown embodiment, the unit RNNs are the same RNN that is learned in the same manner. The unit RNN is configured as a supervised learning type network. P coefficient values obtained by performing a Fourier transform during N PRIs and information regarding whether the target exists in each of the range indices are provided to state variables of each hidden layer such that supervised learning is achieved.

Subsequently, a range index in which the target exists is selected based on the probabilities of the existence of the target in the range indices from the outputs of all the unit RNNs (S190). In an embodiment, a range index having a target existence probability of 80% or higher is selected as the range index in which the target exists.

Figure 4:
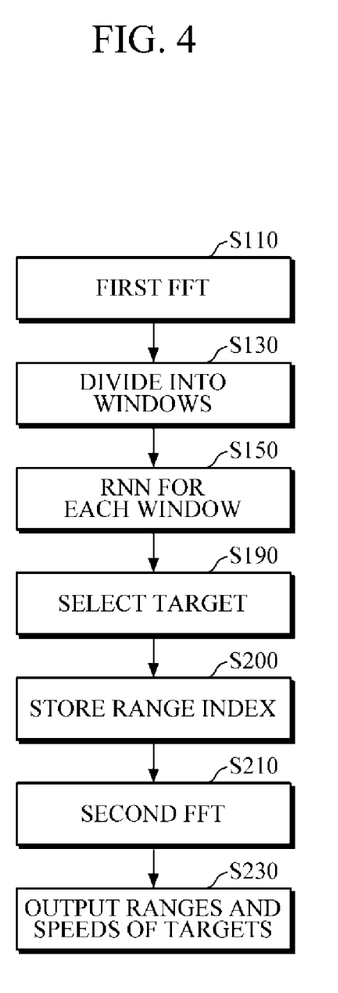
FIG. 4 is a flowchart showing a method for radar signal processing according to yet another embodiment.

FIG. 4 is a flowchart showing a method for radar signal processing according to yet another embodiment. The elements referred to by the same reference numerals as those shown in the embodiment of FIG. 3 have similar configurations, and thus a detailed description thereof will be omitted. According to an additional aspect, the method for the radar signal processing according to the shown embodiment includes storing range data of the selected range index in which the target exists over a plurality of PRIs after the target is selected (S200). Subsequently, a Fourier transform is performed on the range data stored over the plurality of PRIs to calculate a speed-index-specific coefficient value (S210). When a plurality of range indices in which the target exists are selected, that is, when a plurality of targets are selected, a Fourier transform is performed on each piece of range data. Subsequently, the ranges and speeds of the selected targets are calculated and output (S230).

Figure 5:
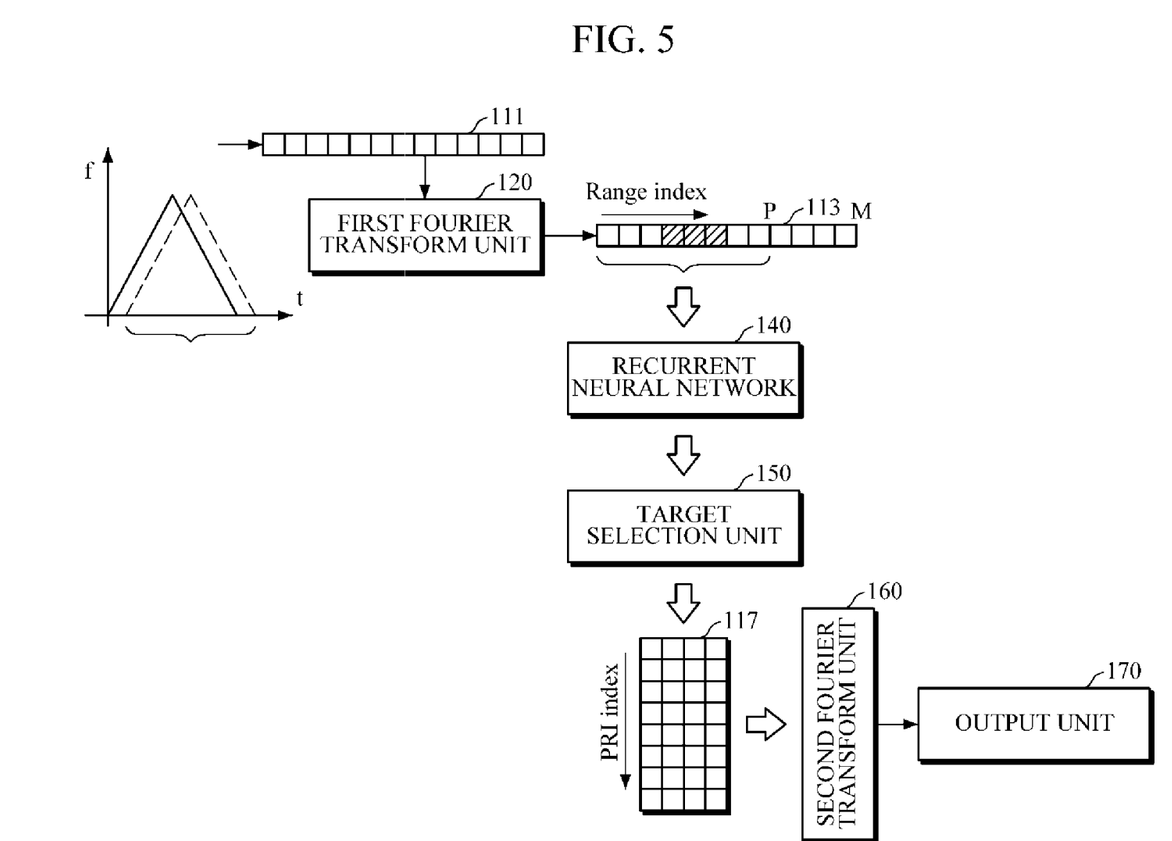
FIG. 5 is a block diagram showing a configuration of an apparatus for radar signal processing according to an embodiment.

FIG. 5 is a block diagram showing a configuration of an apparatus for radar signal processing according to an embodiment. As shown, the apparatus for the radar signal processing according to an embodiment includes a first Fourier transform unit 120, an RNN 140, a first memory controller 130, and a target selection unit 150. A radar signal received through an antenna is amplified, frequency-synthesized, filtered, digitally sampled, and supplied to the apparatus for the radar signal processing according to the proposed invention. Herein, this signal is referred to as an FMCW digital radar signal.

The first Fourier transform unit 120 performs a Fourier transform on an FMCW digital radar signal at every PRI to generate range data, which indicates range-index-specific coefficient values. In the shown embodiment, a fast Fourier transform (FFT) is used as the Fourier transform. When a pulse repetition interval, which is called a chirp, is referred to as PRI and a sampling frequency is referred to as fs, the number of samples per pulse repetition interval is PRI×fs. Accordingly, a buffer memory 111 has a size of PRI×fs. When M frequency component coefficient values are found through an M-point Fourier transform, the range index in FIG. 5 has a value ranging from 1 to M. The coefficient values obtained by the first Fourier transform unit 120 performing a Fourier transform is referred to as "range data" in the sense that they include range information.

The RNN 140 finds the probability of the existence of the target in each range index on the basis of the range data output at every PRI. The RNN 140 has P Fourier transform coefficients among M Fourier transform coefficients as an input, and computes and outputs the existence of, and the probability of the existence of, the target of each of E adjacent range indices at every K PRIs. The target selection unit 150 selects a range index in which the target exists on the basis of the probabilities of the existence of the target in the range indices calculated by the RNN 140. In an embodiment, the target selection unit 150 selects and outputs a range index having a target existence probability of 80% or higher. Through an experimental result, it was confirmed that the RNN 140 can detect a plurality of targets that are spaced at different distances.

According to still another aspect, the apparatus for the radar signal processing may perform a Fourier transform on the range data in which the target is determined as existing and may provide speed information. Since a Fourier transform is performed on only the range data in which the target is determined as existing, it is possible to reduce the number of Fourier transforms and the amount of computation.

According to such an aspect, the apparatus for the radar signal processing according to an embodiment may further include a time axis memory 117, a second Fourier transform unit 160, and an output unit 170. The time axis memory 117 stores range data of the range index in which the target exists selected by the target selection unit 150 over a plurality of, i.e., N PRIs. The second Fourier transform unit 160 performs a Fourier transform on the range data of the same selected range index in which the target exists, and calculates a speed-index-specific coefficient value. As shown, the second Fourier transform unit 160 accesses the time axis memory 117 in the direction of the time axis and has N pieces of data as an input. In the shown embodiment, the second Fourier transform unit 160 is an FFT transformer. Coefficient values obtained by re-performing a Fourier transform on Fourier coefficients obtained through transformation by the first Fourier transform unit 120 in the direction of the PRI index, that is, in the direction of the time axis are referred to as "speed index"-specific coefficient values in the sense that they include speed information.

The output unit 170 calculates and outputs range and speed information of selected targets on the basis of the outputs of the second Fourier transform unit. Computations by the FMCW radar to find the range and speed on the basis of a bit is frequency are well known, and a detailed description thereof will be omitted.

Figure 6:
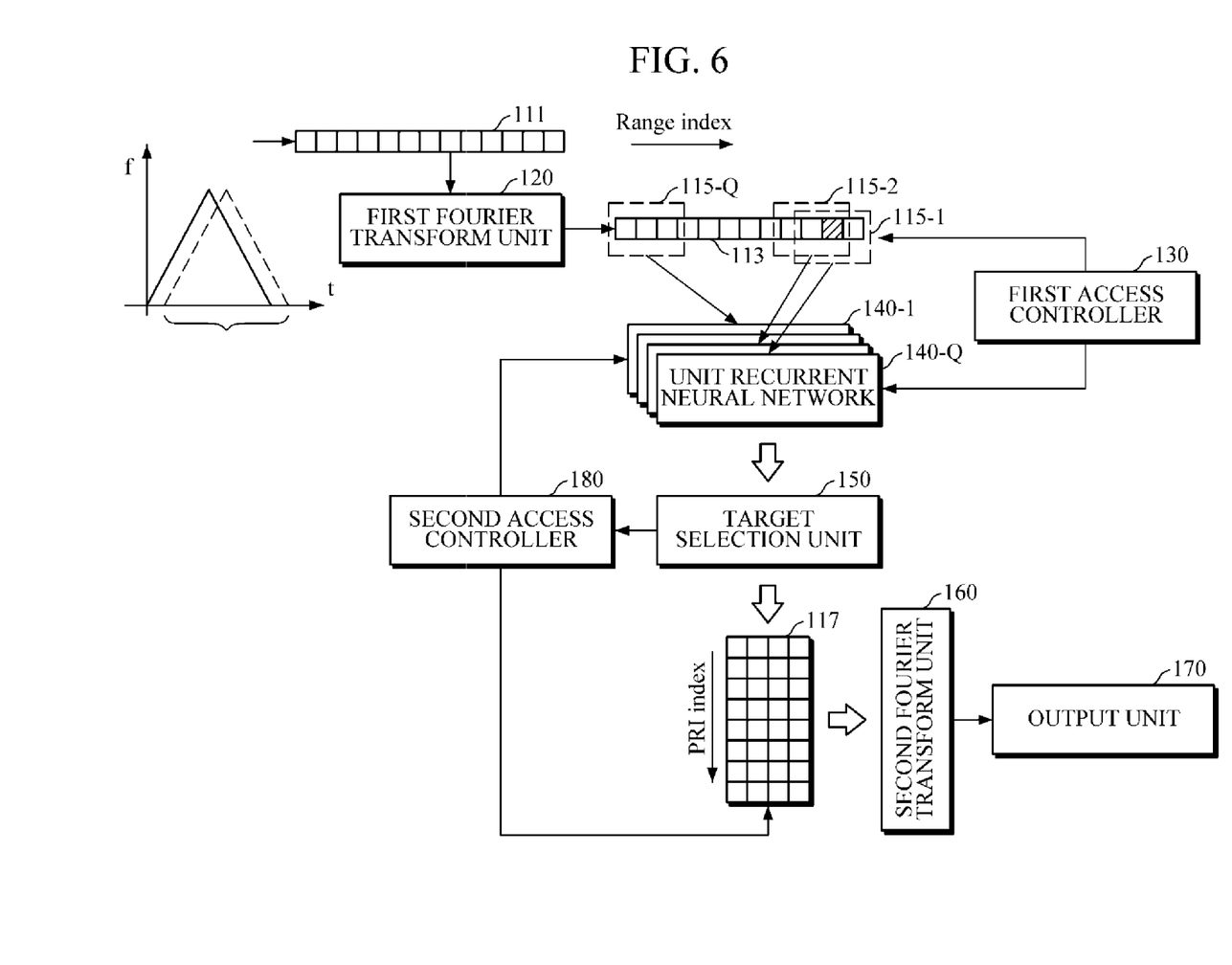
FIG. 6 is a block diagram showing a configuration of an apparatus for radar signal processing according to another embodiment.

FIG. 6 is a block diagram showing a configuration of an apparatus for radar signal processing according to another embodiment. As shown, the apparatus for the radar signal processing according to an embodiment includes a first Fourier transform unit 120, a plurality of unit RNNs 140-1, . . . , and 140-Q, a first access controller 130, and a target selection unit 150. The first Fourier transform unit 120 performs a Fourier transform on an FMCW digital radar signal at every PRI to generate range data, which indicates range-index-specific coefficient values. In the shown embodiment, a fast Fourier transform (FFT) is used as the Fourier transform. When a pulse repetition interval, which is called a chirp, is referred to as PRI and a sampling frequency is referred to as fs, the number of samples per pulse repetition interval is PRI×fs. Accordingly, a buffer memory 111 has a size of PRI×fs. When M frequency component coefficient values are found through an M-point Fourier transform, the range index in FIG. 6 has a value ranging from 1 to M.

The plurality of unit RNNs 140-1, . . . , and 140-Q find the probability of the existence of the target in each range index on the basis of the range data output at every PRI. The first access controller 130 supplies the range data to the plurality of unit RNNs 140-1, . . . , and 140-Q in units of a window. Windows are set to include data having a plurality of continuous range indices and to partially overlap each other. That is, when the number of pieces of range data processed by one unit RNN among M pieces of range data is P, the windows are set to include data having a plurality of continuous range indices and to partially overlap each other. Each window is a one-dimensional window consisting of P continuous FFT coefficient values. When the windows are set to include E range indices of interest and B range indices present on each of the left and right sides of each of the range indices of interest, that is, the windows are set to include P (=2B+E<M) range indices, the range indices of interest other than 2B range indices, which correspond to an overlapping part in each window, are set to cover all the range indices. That is, when the number of windows is Q, it is achieved that M=Q×E. The first access controller 130 performs control such that data of Q windows corresponding to the unit RNNs 140-1, . . . , and 140-Q is input. Since the windows are set to overlap each other, a path is provided so that coefficient values of one cell can be supplied to a plurality of unit RNNs. In the shown embodiment, Q unit RNNs have P FFT coefficient values as an input and then output the existence of, and the probability of the existence of, the target of each of P range indices at every K PRIs.

In the shown embodiment, the unit RNNs 140-1, . . . , and 140-Q are the same RNN that is learned in the same manner. In an embodiment, the unit RNNs 140-1, . . . , and 140-Q are configured as a supervised learning type network. P coefficient values obtained by performing a Fourier transform during N PRIs and information regarding whether the target exists in each of the range indices are provided to state variables of each hidden layer, and thus supervised learning is achieved.

The target selection unit 150 selects a range index in which a target exists on the basis of the probabilities of the existence of the target in the range indices calculated by the RNN 140. In an embodiment, the target selection unit 150 selects and outputs a range index having a target existence probability of 80% or higher. Through an experimental result, it was confirmed that each unit RNN can detect a plurality of targets that are spaced at different distances.

According to still another aspect, the apparatus for the radar signal processing may perform a Fourier transform on the range data in which the target is determined as existing and may provide speed information. Since a Fourier transform is performed on only the range data in which the target is determined as existing, it is possible to reduce the number of Fourier transforms and the amount of computation.

According to such an aspect, the apparatus for the radar signal processing according to an embodiment may further include a time axis memory 117, a second Fourier transform unit 160, and an output unit 170. The time axis memory 117 stores range data of the range index in which the target exists selected by the target selection unit 150 over a plurality of, i.e., N PRIs. The second Fourier transform unit 160 performs a Fourier transform on the range data of the same selected range index in which the target exists, and calculates a speed-index-specific coefficient value. As shown, the second Fourier transform unit 160 accesses the time axis memory 117 in the direction of the time axis and has N pieces of data as an input. In the shown embodiment, the second Fourier transform unit 160 is a fast Fourier transformer (FFT). Coefficient values obtained by re-performing a Fourier transform on Fourier coefficients obtained through transformation by the first Fourier transform unit 120 in the direction of the PRI index, that is, in the direction of the time axis are referred to as "speed index"-specific coefficient values in the sense that they include speed information.

The output unit 170 calculates and outputs range and speed information of selected targets on the basis of the outputs of the second Fourier transform unit. Computations by the FMCW radar to find the range and speed on the basis of a bit frequency are well known, and a detailed description thereof will be omitted.

According to the proposed invention, it is possible to confirm, through simulation, that detection failure or over-detection is efficiently avoided during FMCW radar signal processing. Also, compared to the conventional method, a method capable of reducing circuit complexity and also the amount of computation is proposed.

The present invention has been described above with reference to embodiments referring to the accompanying drawings, but is not limited thereto. Rather, the present invention should be construed as encompassing various modifications that may be apparent to those skilled in the art. The following claims are intended to cover the modifications.

What is claimed is:

1. A method for radar signal processing performed by an apparatus for tracking a radar target, the method comprising:
   a signal reception operation to receive a frequency modulated continuous wave (FMCW) digital radar signal by a radar antenna;
   a first Fourier transform operation to perform a first Fourier transform on the FMCW digital radar signal at every pulse repetition interval (PRI) to generate range data, which indicates range-index-specific coefficient values;
   a recurrent neural network (RNN) processing operation to determine the probability of the existence of a target in each range index based on the range data output at every PRI, wherein the RNN is configured as a supervised learning type network trained using information regarding whether the target exists in each of the range indices;
   a target selection operation to select first range indices each representing that a target exists based on the probabilities of the existence of the target in the range indices, wherein the range indices further comprise second range indices each representing that a target does not exist based on the probabilities of the existence of the target;
   a storage operation to store range data of the selected first range indices in which the target exists over a plurality of PRIs;
   a second Fourier transform operation to perform a second Fourier transform on range data of the first range indices in the direction of the PRI index, wherein the first range indices are selected by the target selection operation, each representing the target exists to calculate a speed-index-specific coefficient value, wherein the second Fourier transform operation is not performed for the second range indices each representing that a target does not exist based on the probabilities of the existence of the target; and
   an output operation to output ranges and speeds of the selected targets.

2. The method of claim 1, wherein the RNN processing operation comprises:
   a setting operation in which a plurality of windows are set to include data having a plurality of continuous range indices and partially overlap each other; and
   a unit neural network processing operation in which data belonging to each of the windows is processed with the same unit RNN to find the probability of the existence of the target in each of the range indices.

3. The method of claim 1, wherein the RNN operation is performed subsequent to the first Fourier transform operation, the target selection operation is performed subsequent to the RNN operation, and the second Fourier transform operation is performed subsequent to the target selection operation.

4. The method of claim 1, wherein at least some among all the range indices are not selected by the target selection operation.

5. An apparatus for radar signal processing for tracking a radar target, the apparatus comprising:
   a processor, and a memory, wherein the processor, when executing program instructions stored in the memory, is configured to:
   perform a signal reception operation to receive a frequency modulated continuous wave (FMCW) digital radar signal by a radar antenna;
   perform a first Fourier transform on the FMCW digital radar signal at every pulse repetition interval (PRI) to generate range data, which indicates range-index-specific coefficient values;
   implement a recurrent neural network (RNN) to determine the probability of the existence of a target in each range index on the basis of the range data output at every PRI, wherein the RNN is configured as a supervised learning type network trained using information regarding whether the target exists in each of the range indices;
   perform a target selection operation to select a first range indices each representing that a target exists based on the probabilities of the existence of the target in the range indices calculated by the RNN, wherein the range indices further comprise second range indices each representing that a target does not exist based on the probabilities of the existence of the target;
   store range data of the first range indices in which the target exists over a plurality of PRIs;
   perform a second Fourier transform on the stored range data of the first range indices in the direction of the PRI index, wherein the first range indices are selected by the target selection operation, each representing that the target exists to calculate a speed-index-specific coefficient value, wherein the second Fourier transform is not performed for the second range indices each representing that a target does not exist based on the probabilities of the existence of the target; and
   calculate and output ranges and speeds of selected targets.

6. The apparatus of claim 5, wherein the RNN comprises:
   a plurality of unit neural networks,
   wherein the range data is supplied to the plurality of unit neural networks in units of windows,
   wherein each of the windows is set to include data having a plurality of continuous range indices and partially overlap each other.

7. The apparatus of claim 5, wherein the RNN operation is performed subsequent to the first Fourier transform operation, the target selection operation is performed subsequent to the RNN operation, and the second Fourier transform operation is performed subsequent to the target selection operation.

8. The apparatus of claim 5, wherein at least some among all the range indices are not selected by the target selection operation.

9. A method for radar signal processing performed by an apparatus for tracking a radar target, the method comprising:
   a signal reception operation to receive a frequency modulated continuous wave (FMCW) digital radar signal by a radar antenna;
   a first Fourier transform operation to perform a first Fourier transform on the frequency FMCW digital radar signal at every pulse repetition interval (PRI) to generate range data, which indicates range-index-specific coefficient values;
   a recurrent neural network (RNN) processing operation, performed subsequent to the first Fourier transform operation, to determine the probability of the existence of a target in each range index based on the range data output at every PRI, wherein the RNN is configured as a supervised learning type network trained using information regarding whether the target exists in each of the range indices;
   a target selection operation, performed subsequent to the RNN processing operation, to select first range indices each representing that a target exists based on the probabilities of the existence of the target in the range indices,
   a storage operation to store range data of the selected first range indices in which the target exists over a plurality of PRIs;
   a second Fourier transform operation, performed subsequent to the target selection operation, to perform a second Fourier transform on range data of the first range indices in the direction of the PRI index, wherein the first range indices are selected by the target selection operation, each representing the target exists to calculate a speed-index-specific coefficient value; and
   an output operation to output ranges and speeds of the selected targets.

10. The method of claim 9, wherein the range indices further comprise second range indices each representing that a target does not exist based on the probabilities of the existence of the target, and wherein the second Fourier transform operation is not performed for the second range indices each representing that a target does not exist based on the probabilities of the existence of the target.

* * * * *